Feb. 19, 1935.  H. B. HARTMAN  1,991,668
OZONE GENERATOR
Filed Dec. 12, 1931  2 Sheets-Sheet 1
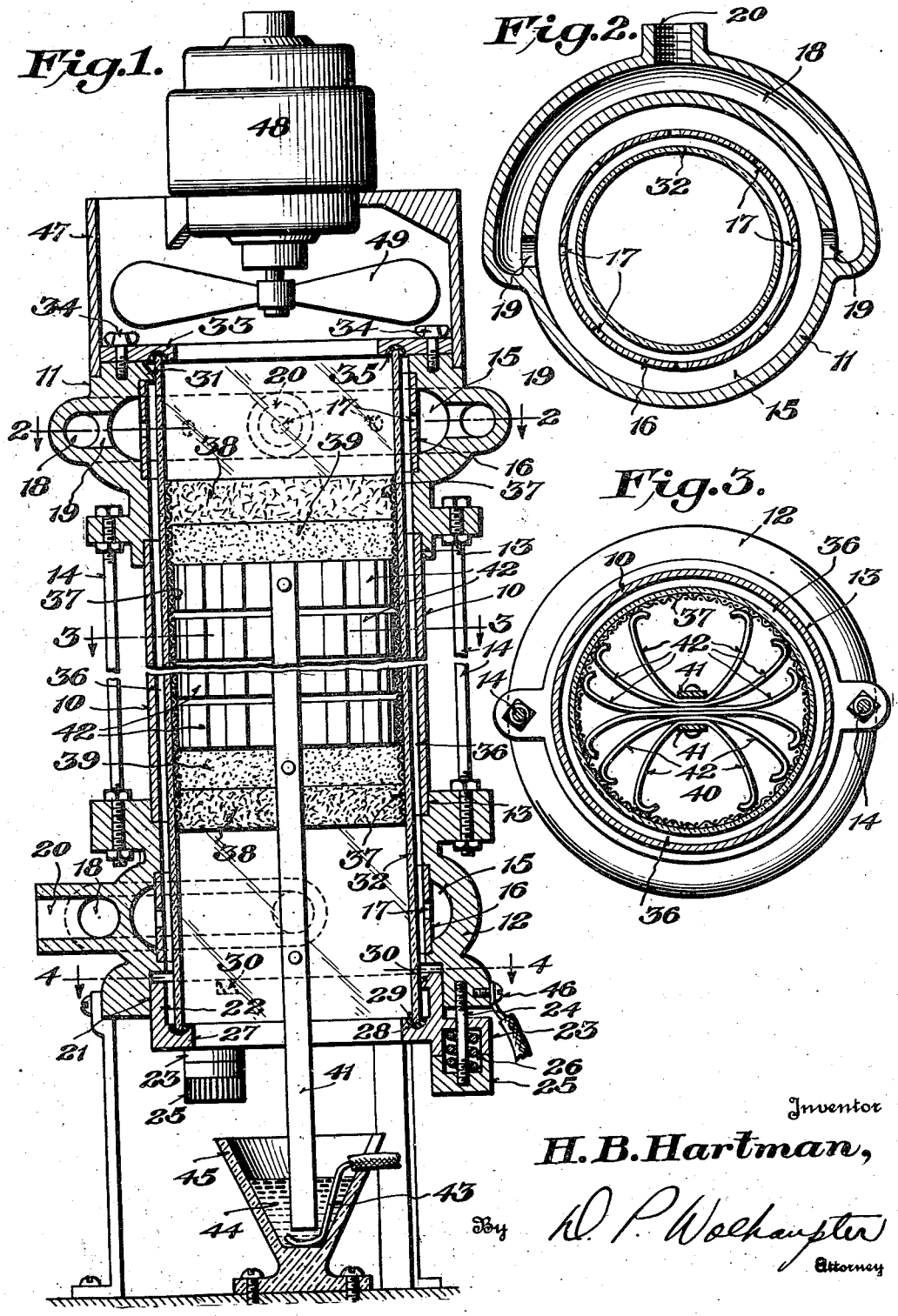
Inventor
H. B. Hartman, Feb. 19, 1935. H. B. HARTMAN 1,991,668
OZONE GENERATOR
Filed Dec. 12, 1931 2 Sheets-Sheet 2
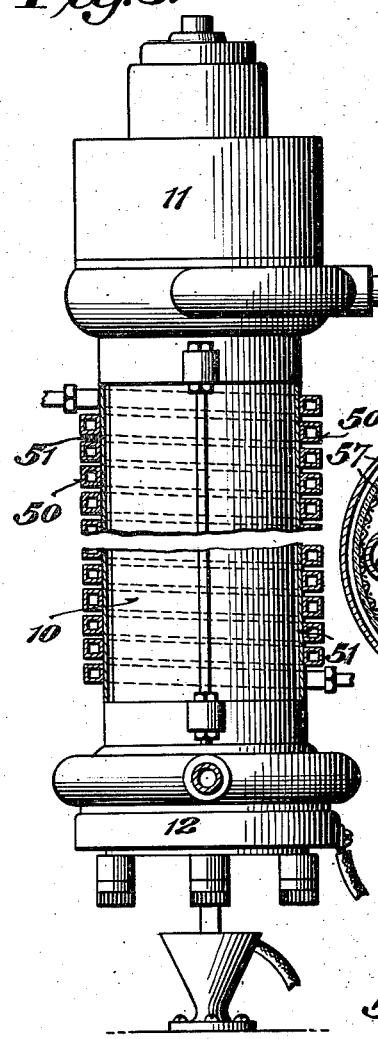
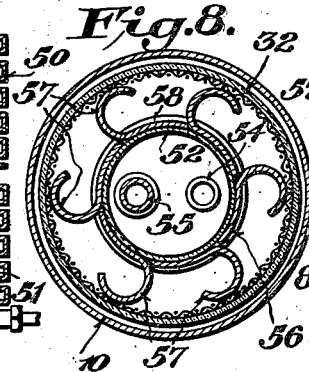
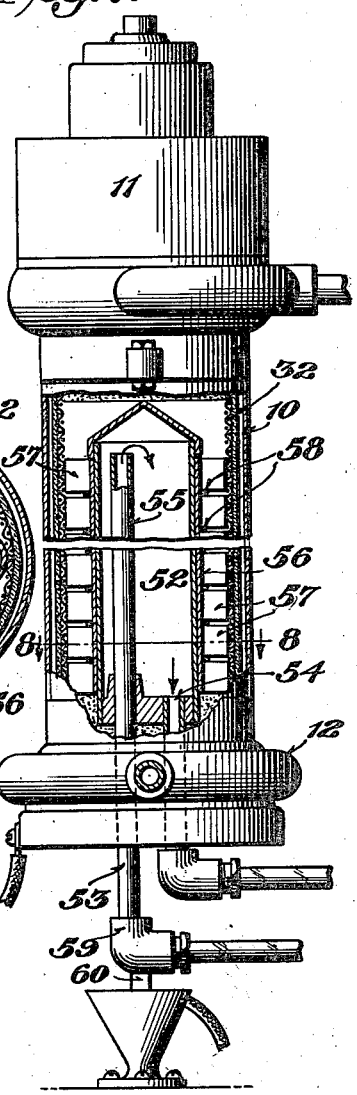
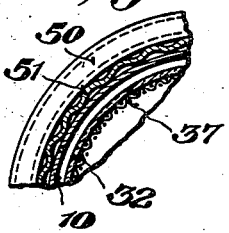
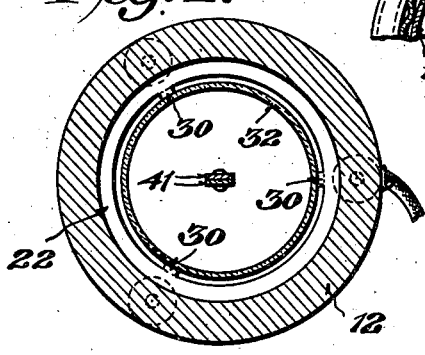
Inventor
H. B. Hartman, Patented Feb. 19, 1935

1,991,668

UNITED STATES PATENT OFFICE 1,991,668

OZONE GENERATOR

Harry Buxton Hartman, Buffalo, N. Y.

Application December 12, 1931, Serial No. 580,667

10 Claims. (Cl. 204—32)

This invention relates to ozone generators, and has generally in view to provide an ozone generator which is suitable both for commercial use and for laboratory research work, and which embodies various novel features of construction and arrangement rendering the same particularly desirable from an economical production and maintenance standpoint and also from the standpoint of high efficiency in operation.

A special object of the invention is to provide an ozone generator embodying a construction whereby the same may readily be adapted for efficient cooling either by air alone, by air and water, or by air, water and oil, thereby to adapt the same for the efficient generation of ozone by the use of electric currents of various different magnitudes.

Another object of the invention is to provide an ozone generator embodying a construction to assure uniformity in width of the air gap or polar space through which the dehydrated air passes and across which the ozonating brush discharge takes place, thus to obtain uniformity in the intensity of the brush discharge; also, in this connection to provide for a uniform flow of air through all portions of the air gap or polar space across which the brush discharge takes place to obtain high efficiency and rapidity in the production of ozone.

Another object of the invention is to provide a novel electrode embodying a construction designed to avoid undesirable edge discharge therefrom.

Another object of the invention is to provide novel and efficient means for electrically connecting the aforesaid electrode with the source of current and for maintaining the same in correct operative relationship to the dielectric element interposed between said electrode and the cooperating electrode.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a central vertical section through an ozone generator constructed in accordance with one practical embodiment of the invention.

Figure 2 is a cross section on the line 2—2 of Fig. 1.

Figure 3 is a cross section on the line 3—3 of Fig. 1.

Figure 4 is a cross section on the line 4—4 of Fig. 1.

Figure 5 is a view partly in side elevation and partly in section showing the water cooling means for the generator.

Figure 6 is a cross section of the structure shown in Fig. 5.

Figure 7 is a view similar to Fig. 5 showing the oil cooling means for the generator; and Figure 8 is a cross section on the line 8—8 of Fig. 7.

Referring to the drawings in detail, it will be observed that the present generator is inclusive essentially of a casing of preferably elongated cylindrical shape, disposed vertically and composed preferably of a section of tubing 10 confined between top and bottom end castings 11 and 12, respectively, said castings being formed at their lower and upper ends, respectively, with suitable seats 13 for the ends of the tube 10 and being connected together by tie rods 14 disposed outwardly of said tube, whereby the tube and the end castings are adapted to be held firmly and rigidly in assembly with each other and whereby these parts are adapted for facile disassembly and subsequent reassembly whenever desired.

The seats 13 are formed preferably by enlarging the bores of the castings 11 and 12 at their lower and upper ends, respectively, to snugly receive the ends of the tube 10. Thus, the tube is adapted to be embraced at its ends by portions of the castings and to seat at its ends against the shoulders formed by the enlargements of the bores of the casing so that when the castings are drawn relatively inward to clamp the tube therebetween in a rigid, unitary assembly, air tight joints are produced between the castings and the ends of the tube with the inner faces of the bores of the castings forming in effect flush continuations of the inner face of the tube.

Between its ends each casting 11 and 12 is formed with an annular channel 15 opening into the bore thereof, and to either side of this channel each casting is recessed for the accommodation of the edges of a ring or band 16 whereby the inner faces of said bands are, like the inner face of the tube 10, adapted to be disposed flush with the bores of the castings. The bands are split whereby they are adapted to be compressed for insertion into the castings and to expand into their seats formed by the aforesaid recesses at either side of the channels 15, and they are each provided with a plurality of apertures 17 which are of such size and so spaced circumferentially thereof as to assure that air supplied to the channel 15 of either casting, or delivered from the bore of either casting into the channel 15 thereof, will flow into or from the bore of the casting in substantially equal amounts at equally spaced points therearound.

Outside of its annular channel 15 each casting 11 and 12 is formed with an air passageway 18 which extends approximately one-half the distance around the casting and which is connected at its ends with the channel 15 at diametrically opposite points as indicated at 19, 19, the air inlet or outlet 20 to or from said passageway, as the case may be, being located preferably midway between the ends thereof. Thus, air entering the passageway of either casing divides into two streams and enters the channel 15 at diametrically opposite points, thereby greatly assisting in obtaining desired uniformity in the flow of air into the bore of the casting through the openings 17 in the band 16. On the other hand, in the case of air being delivered from the bore of either casting, the passageway 18 connected with the channel 15 in the manner stated provides for the same uniformity in the outflow of the air as in the case of inflowing air.

Air for ozonizing is adapted to be supplied to one of the castings, preferably the bottom casting 12, and to flow through the tube 10 to the other casting from which it is to be discharged, and in this connection, in order further to assist in obtaining as nearly as possible a uniform flow of air at all points around the castings and the tube 10, the passageways 18 of the respective castings preferably are disposed in right angular relation to each other.

At the bottom of the casting 12 the bore thereof is enlarged as indicated at 21 to snugly and slidably receive a sleeve 22 which is provided with a plurality of outwardly extending ears 23 spaced circumferentially thereof. These ears are apertured to receive studs 24 which extend downward from the casting and which have nuts 25 threaded thereon below the ears, while between said ears and said nuts are interposed coil springs 26 which react from the nuts to tend to urge the sleeve 22 constantly upward wtihin the casting bore enlargement 21. Preferably, but not necessarily, the ears 23 and the nuts 25 are recessed as shown to accommodate the springs 26.

An annular flange 27 extends inwardly from the sleeve 22 at a suitable point below the top thereof and has formed in the upper side thereof an annular groove 28 in which is disposed a gasket 29, while above said flange the sleeve is formed with a plurality of circumferentially spaced, inwardly directed lugs 30 which have their upper faces beveled downwardly towards their free inner ends. At its top the casting 11 is provided with similar lugs 31.

At 32 is designated a glass tube which is of suitably less external diameter than the internal diameter of the tube 10 and the bores of the castings 11 and 12 and which is adapted to be placed within the casing constituted by the tube 10 and the castings 11 and 12 as shown. In the assembly of said tube 32 with said casing the tube is adapted to be slid downward through the casing until its lower end rests on the gasket 29, and in this connection it is apparent that the lugs 30 and 31 constitute positioning members for the tube to hold the same evenly spaced from the tube 10 and the walls of the castings 11 and 12. Moreover, in this connection it is further apparent that due to the beveling of the tops of the lugs 30, 31 the tube during its insertion into the casing is guided between the lugs so that its insertion is greatly facilitated.

Following insertion of the tube 32 into the casing it is secured therein by a ring 33 fastened against the upper end of the casting 11 by thumb screws 34, said ring being of a width to overlie the upper edge of the tube and being formed in its under face with an annular groove in which is disposed a gasket 35 against which the upper edge of the tube seats. Thus, with the ring 33 fastened tightly against the upper end of the casting 11, it is apparent that due to the constant tendency of the springs 26 to urge the sleeve 22 upwardly, the gaskets 29 and 35 are caused to seal tightly against the ends of the tube 32 whereby the ozonating space 36 between said tube and the casing elements 10, 11 and 12 is effectively sealed against the escape of air into or from the same except through the apertured bands 16.

A so-called brush discharge of electricity is adapted to take place across the space 36 to effect ozonation of air flowing through said space, and to this end the tube 10 and the castings 11 and 12 collectively constitute what may appropriately be termed the outer electrode of the generator, the other or inner electrode of which is constituted by an element 37 of novel construction held in a novel manner within and in engagement with the dielectric tube 32.

The electrode element 37 is composed of a sheet of suitable cloth or similar flexible material having bands 38 of suitable width at its ends impregnated and coated with a suitable current resistance material or composition comprising, for example, powdered carbon. Inwardly of these insulating bands are other bands 39 of suitable width impregnated and coated with a material or composition of partial but relatively poor conductivity comprising, for example, a mixture of powdered carbon and powdered copper in the proportion of about three to one, while between the bands 39 and throughout the major portion of its area the sheet is impregnated and coated with a good current conducting material or composition comprising, for example, powdered copper.

The electrode element 37 may be formed either as a tube to fit snugly within the tube 32, or as a flat sheet to be formed into tubular shape for insertion into said tube 32, and in either event it is adapted to be held within said tube in close contact therewith throughout its area by a novel current conductor designated generally as 40.

The current conductor 40 comprises a pair of strips 41 of copper or the like between which are secured at longitudinally spaced points transverse strips 42 of copper or the like which are bent to substantially radiate from the strips 41 and to collectively engage the inner face of the electrode element 37 at numerous longitudinally and circumferentially spaced points, said strips 42 being inherently resilient whereby they serve to press and to maintain the electrode element in snug engagement with the tube 32.

Regarding the strips 41 of the conductor 40 it will be observed that the same are of a length to extend through the open lower end of the tube 32 to a point below the bottom of the generator, and that connection of said strips with the related wire 43 or other conductor from a current source is effected by immersion of the ends of said strips into a body of mercury 44 which is contained within a suitable cup 45 and which has an exposed end of the wire 43 disposed therein, the other wire or conductor from the source of current being suitably connected with the outer electrode as, for example, as indicated at 46. Thus, inasmuch as the electrode element 37 and the conductor 40 are adapted to be assembled within the dielectric tube 32 prior to the insertion of said tube into the generator casing, and inasmuch as the hands engage only the dielectric tube 32 during insertion of the assembly into the casing, it follows that since the high tension circuit is completed by immersion of the lower ends of the strips 41 into the mercury 44 only after substantially complete insertion of the tube assembly, any danger of accident from the high tension current even in the event of failure of the operator to take the precaution to cut off the current prior to insertion of the tube assembly into the casing is substantially eliminated.

Formed to fit over a reduced upper end portion of the top casting 11 and to rest on the shoulder formed by said reduced portion, is a relatively short tubular member 47 constituting a support for a motor 48 having a fan 49 disposed within said member, operation of the fan by said motor being adapted to effect a cooling flow of air through the generator.

The operation of the generator is apparent and as follows: Air is supplied through one of the castings 11 or 12 and flows through the ozonating space 36 to and through the other casting, the direction of flow preferably being upward. With the circuit to the electrodes closed a so-called brush discharge takes place across the space 36 and ozonation of the air flowing through said space is effected, the generator being maintained cool by the cooling draft of air which is caused to flow therethrough by the fan 49.

Preferably the tube 10 is formed from stainless steel which has little or no tendency to pit even though some moisture may be contained in the air supplied to the generator, and inasmuch as the construction shown and described permits ready disassembly of the generator for replacement of a dielectric tube 32 in case of accident, or for any other purpose, it is a relatively easy matter to keep the inner face of the tube 10 wiped clean and bright so as to assure an effective brush discharge at all times. Moreover, by reason of the novel features of construction and assembly of the parts of the present generator it is apparent that an ozonating space 36 of uniform width so essential to efficient ozonation is assured; that a substantially uniform flow of air through said space is assured; that the yieldable mounting of the tube 32 afforded by the springs 26 serves to maintain the seals at the ends of the tube and substantially eliminates any likelihood of breakage of the tube due to differences in expansion or contraction between different parts of the generator, or to exerting excessive clamping pressure on said tube; that ordinary plain glass tubes may be used in lieu of expensive tubes having a coating of conductive material; that the novel inner electrode eliminates all edge discharge whereby the formation of nitrous oxide so detrimental to generators and to the formation of pure ozone is eliminated; that the conductor 40 provides not only for holding the novel inner electrode in correct operative position within the dielectric tube, but assures at the same time good electrical contact with said electrode at a number of points whereby heating is to a considerable extent avoided, and that by reason of the draft of cooling air caused to flow through the generator by the fan 49 a cool generator so essential to the efficient production of ozone also is assured.

In some instances, as, for example, where it is desired to use a current of relatively high voltage and cycle, it may be found desirable to employ means in addition to the fan 49 to effect cooling of the generator. Accordingly, a practical embodiment of an additional cooling means for use with the present generator is illustrated in Figs. 5 and 6 of the drawings and comprises a tube 50 of suitable material coiled to fit around the tube 10 and to have a suitable cooling medium circulated therethrough. Preferably said tube 50 is of a cross section such that at least the inner sides of the coils thereof are flat to most effectively serve to conduct heat from the tube 10, and in this connection, although the tube 50 may have direct contact with the tube 10, nevertheless it is preferred in order to facilitate assembly and to assure efficient conduction of heat from the tube 10 to interpose between said tube and the tube 50 a corrugated sleeve 51 which by its spring action makes firm contact with both of said tubes.

Another cooling means for use with the present generator whenever desired is illustrated in Figs. 7 and 8 of the drawings and is adapted in addition to be used in lieu of and to serve the purpose of the conductor and electrode holder 40 illustrated in Fig. 1 of the drawings. This combined cooling means, conductor and inner electrode holder comprises a hollow cylinder 52 of suitable electrical conducting material closed at its ends and having connected therewith at its lower end a pair of tubes 53 and 54, for the inlet and outlet of a suitable cooling medium to and from the same, there being a tube 55 extending from one of the tubes 53 or 54 through the cylinder to a point near its upper end to assure a circulation of the cooling medium throughout the length of the cylinder. Surrounding the cylinder 52 are several strips 56 of copper or other electrical conducting material which are slit at longitudinally spaced points to provide numerous tongues 57 which are bent outwardly from said strips. The strips are secured against the cylinder in any suitable manner, as, for example, by means of a binding wire or wires 58 wrapped around the strips between the tongues thereof, the cylinder with the strips thereon being adapted for insertion into the dielectric tube 32 and the tongues 57 being adapted to perform the functions of the tongues of the heretofore described conductor element 40. In this connection and in order to provide for supply of current to the tongues 57, at least one of the tubes 53 or 54 is formed of electrical conducting material and has connected therewith through an elbow 59 a contact rod 60 for immersion in the mercury 44, the other of said tubes being either of conducting or non-conducting material as may be desired. In any event, however, the feed and discharge lines to and from the tubes 53, 54 are formed either in their entirety or in part at least of electrical insulating material, such as glass, for an obvious purpose.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An ozone generator comprising an outer electrode in the form of a cylindrical casing, a hollow cylindrical member of dielectric material disposed within and spaced from said casing, an inner electrode within said hollow member, end members each having a channel providing an annular channel surrounding the annular space between said casing and said hollow member at each end of the generator, a wall element between each channel and said annular space apertured at circumferentially spaced points, means providing an air inlet passageway connected with one of said annular channels at diametrically opposite points, and means providing an air outlet passageway connected with the other of said channels at diametrically opposite points disposed in right angular relation to the points of connection of the first mentioned passageway with its related channel.

2. In an ozone generator, an outer electrode, a hollow cylindrical dielectric member within and spaced from said outer electrode, means for the supply of air to the space between said outer electrode and said dielectric member and for the escape of ozone from said space, an inner cylindrical electrode within and disposed against said dielectric member, a cylinder insertable into the dielectric member, fingers carried by said cylinder for engagement with the inner electrode and for conducting current thereto, and means for circulating a cooling medium through said cylinder.

3. An ozone generator comprising an outer electrode in the form of a cylindrical casing, a tube of dielectric material of less diameter than said casing disposed therein, means for the supply of air to one end and for the escape of air from the other end of the annular space between said casing and said tube, an inner electrode separate from said tube and within the same, a conductor comprising a plurality of longitudinally and circumferentially spaced contact fingers engaging and holding said inner electrode against the inner face of said tube, said inner electrode comprising flexible material having end zones impregnated with electrical resistance material to minimize the effect of brush discharge, and between said end zones being impregnated with an electrical conducting material.

4. An ozone generator comprising an outer electrode in the form of a cylindrical casing, a tube of dielectric material of less diameter than said casing disposed therein, means for the supply of air to one end and for the escape of air from the other end of the annular space between said casing and said tube, an inner electrode separate from said tube and within the same, a conductor comprising a plurality of longitudinally and circumferentially spaced contact fingers engaging and holding said inner electrode against the inner face of said tube, said inner electrode comprising flexible material having end zones impregnated with electrical resistance material, a zone inwardly of each end zone impregnated with material which is partially electrically conductive and partially electrically resistant, and a zone of major length between said second mentioned zones impregnated with electrical conducting material.

5. An ozone generator including a tubular outer electrode, an abutment at one end of said electrode, a dielectric member arranged within said outer electrode and spaced therefrom, one end of said dielectric member bearing against said abutment, an inner electrode within said dielectric member, and a ring-like member slidably mounted in the other end of said outer electrode and having a seat for engaging the other end of the dielectric member, and means for yieldably connecting said ring-like member to said outer electrode.

6. In a tubular ozone generator, a combined dielectric and electrode unit comprising a tubular dielectric member, and a tubular electrode member engaging with the inner face thereof, a conductor element including a central member and a plurality of contact strips radiating from said central member and engaging with said inner electrode, said strips being longitudinally continuous for the major part of the length of inner electrode thereby serving as conductor strips and heat radiating members, and means for circulating an air blast through the inner electrode member and through the spaces between said strips.

7. In an ozone generator, the combination of a tubular outer electrode, a tubular dielectric within the same, and a central structure serving as a conductor for electricity to the inner electrode and to absorb heat therefrom, said central structure including an axially disposed member and a plurality of yielding plate members extending throughout the major portion of the inner electrode, and a fan mounted to generate and force an air blast through said central structure.

8. In an ozone generator, an electrode having a medial zone of good electrical conductivity, said electrode being of progressively decreasing electrical conductivity from its medial zone to each end thereof.

9. An ozone generator including an outer electrode in the form of a casing, a tube of dielectric material within and spaced from said casing, means for supplying air to the space between said casing and said tube and for the escape of ozone from said space, an inner electrode within said tube, and a conductor engaging said inner electrode, said inner electrode having end walls of electrical resistance material, a medial zone of good electrical conductivity, and a zone between said medial zone and each end zone of less electrical conductivity than the medial zone and of greater electrical conductivity than the end zones.

10. An ozone generator including an outer electrode in the form of a casing, a tube of dielectric material within and spaced from said casing, means for supplying air to the space between said casing and said tube and for the escape of ozone from said space, an inner electrode within said tube, and a conductor engaging said inner electrode, said inner electrode comprising cloth having the end zone portions thereof impregnated with electrical resistance material and the portion between the end zone portions thereof impregnated with material of greater electrical conductivity than the material with which the end zones are impregnated.

HARRY BUXTON HARTMAN.